United States Patent
Brushkivskyy et al.

(10) Patent No.: US 9,631,719 B2
(45) Date of Patent: Apr. 25, 2017

(54) VEHICLE TRANSMISSION AND METHOD FOR ITS OPERATION

(71) Applicant: ZF Friedrichshafen AG, Friedrichshafen (DE)

(72) Inventors: Vyacheslav Brushkivskyy, Kressbronn (DE); Bernd Lutz, Uhldingen-Muehlhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 347 days.

(21) Appl. No.: 14/270,472

(22) Filed: May 6, 2014

(65) Prior Publication Data

US 2015/0000441 A1    Jan. 1, 2015

(30) Foreign Application Priority Data

Jun. 27, 2013    (DE) .................. 10 2013 212 428

(51) Int. Cl.
*F16H 61/00* (2006.01)
*F16H 57/04* (2010.01)
*F16H 61/686* (2006.01)

(52) U.S. Cl.
CPC ..... *F16H 61/0025* (2013.01); *F16H 57/0409* (2013.01); *F16H 61/686* (2013.01); *F16H 2061/0037* (2013.01); *Y10T 74/19251* (2015.01)

(58) Field of Classification Search
CPC ............... F16H 61/0025; F16H 61/686; F16H 57/0409; F16H 57/0473; F16H 2061/0037
USPC ..................................................... 184/6.12
See application file for complete search history.

(56) References Cited

U.S. PATENT DOCUMENTS

| | | | | |
|---|---|---|---|---|
| 3,926,075 A * | 12/1975 | Kronstadt | ............. | B60W 10/06 123/179.24 |
| 4,721,185 A * | 1/1988 | Weigle | ................... | B60R 16/08 123/196 R |
| 4,751,858 A * | 6/1988 | Iwatsuki | ............. | F16H 57/0434 477/164 |
| 5,222,418 A * | 6/1993 | Murota | ............... | F16H 57/0434 184/6.12 |

(Continued)

FOREIGN PATENT DOCUMENTS

DE    10 2004 027 113 A1    12/2005
DE    10 2011 081 006 A1    2/2013

*Primary Examiner* — William Kelleher
*Assistant Examiner* — Gregory Prather
(74) *Attorney, Agent, or Firm* — Davis & Bujold PLLC; Michael J. Bujold

(57) ABSTRACT

A transmission having a plurality of shifting elements which are selectively engaged and disengaged when a gearshift is carried out, and a plurality of gearsets which, depending on the shifting position of the shifting elements produce a defined transmission ratio, and a shifting oil system which supplies the shifting elements with oil in order to operate them and a cooling and lubricating oil system which supplies assemblies of the transmission with oil for cooling and/or lubricating. From the shifting oil provided by the shifting oil system, a partial stream of oil can be tapped off for cooling and/or lubricating the shifting elements, such that a quantity of cooling and lubricating oil that is or can be supplied by the cooling and lubricating oil system can be reduced to the quantity required for cooling and/or lubricating those assemblies of the transmission which do not contain the shifting elements.

8 Claims, 3 Drawing Sheets

(56) References Cited

U.S. PATENT DOCUMENTS

| | | | | |
|---|---|---|---|---|
| 5,700,226 A * | 12/1997 | Droste | F16H 61/0021 | 475/120 |
| 6,135,919 A * | 10/2000 | Shimakura | F16H 57/0434 | 184/27.2 |
| 6,244,385 B1 * | 6/2001 | Tsubata | F16H 57/0412 | 184/26 |
| 6,428,445 B1 * | 8/2002 | Friedmann | F16H 57/0434 | 474/28 |
| 6,692,402 B2 * | 2/2004 | Nakamori | B60K 6/485 | 477/3 |
| 8,042,672 B2 * | 10/2011 | Grethel | F16H 61/0021 | 192/113.3 |
| 8,047,962 B2 * | 11/2011 | Shudo | F16H 61/0021 | 477/127 |
| 8,187,151 B2 * | 5/2012 | Gloge | F16H 61/0031 | 477/159 |
| 8,342,997 B2 * | 1/2013 | Tanaka | F16H 61/143 | 475/65 |
| 8,359,941 B2 * | 1/2013 | Lundberg | F16H 61/0031 | 192/3.58 |
| 8,402,993 B2 * | 3/2013 | Lundberg | F16H 57/0413 | 137/340 |
| 8,413,437 B2 * | 4/2013 | Ghike | B60K 6/48 | 60/422 |
| 8,443,687 B2 * | 5/2013 | Moorman | F16D 48/0206 | 74/335 |
| 8,443,956 B2 * | 5/2013 | Bauer | F16D 25/123 | 192/85.61 |
| 8,464,851 B2 * | 6/2013 | Moorman | F16H 61/0206 | 192/3.3 |
| 8,579,094 B2 * | 11/2013 | Moorman | F16H 61/0031 | 192/3.29 |
| 8,702,548 B2 * | 4/2014 | Moorman | F16H 61/684 | 475/116 |
| 8,784,249 B2 * | 7/2014 | Motodohi | F15B 21/001 | 475/5 |
| 8,826,760 B2 * | 9/2014 | Feldt | F16H 57/0446 | 74/335 |
| 8,840,509 B2 * | 9/2014 | Pignard | F16H 57/0413 | 137/599.11 |
| 8,997,934 B2 * | 4/2015 | Nielsen | F03D 11/0008 | 184/4 |
| 9,022,165 B2 * | 5/2015 | Sah | F16H 61/0021 | 180/338 |
| 9,108,499 B2 * | 8/2015 | Long | B60K 6/48 | |
| 9,234,576 B2 * | 1/2016 | Walgren, Jr. | F16H 61/0021 | |
| 9,316,307 B2 * | 4/2016 | Wi | F16H 61/0031 | |
| 9,383,003 B2 * | 7/2016 | Lundberg | F16H 61/0021 | |
| 2011/0146820 A1 * | 6/2011 | Frerichs | F15B 1/027 | 137/565.11 |
| 2012/0031727 A1 * | 2/2012 | Nett | F16H 57/0409 | 192/113.1 |
| 2012/0060488 A1 * | 3/2012 | Grethel | F15B 21/042 | 60/484 |
| 2012/0103742 A1 * | 5/2012 | Takei | F16H 61/0021 | 192/3.29 |
| 2012/0174570 A1 * | 7/2012 | Xie | F16H 61/0031 | 60/441 |
| 2013/0333980 A1 * | 12/2013 | Tsunashima | F01M 1/02 | 184/6.5 |
| 2014/0034437 A1 * | 2/2014 | Berger | B60W 10/02 | 192/3.58 |
| 2015/0204436 A1 * | 7/2015 | Mafune | F16H 57/0409 | 475/160 |
| 2015/0345616 A1 * | 12/2015 | Schweiher | F16H 57/0409 | 184/6.12 |
| 2016/0023622 A1 * | 1/2016 | Long | F16H 57/0441 | 184/6.12 |

* cited by examiner

VEHICLE TRANSMISSION AND METHOD FOR ITS OPERATION

This application claims priority from German patent application serial no. 10 2013 212 428.7 filed Jun. 27, 2013.

FIELD OF THE INVENTION

The invention concerns a transmission of a motor vehicle. In addition the invention concerns a method for operating a motor vehicle transmission.

BACKGROUND OF THE INVENTION

A motor vehicle transmission comprises a plurality of shifting elements and a number of gearsets, such that in each engaged gear of the transmission a first number of shifting elements are closed or engaged and a second number of shifting elements are open or disengaged. Depending on the shifting positions of the shifting elements and hence depending on the gear engaged, the gearsets of the transmission produce a defined gear ratio. The shifting elements of such a transmission can be in the form of frictional shifting elements such as clutches and/or brakes, or in the form of interlocking shifting elements such as claws. Furthermore, a transmission of a motor vehicle comprises a shifting oil system and a cooling and lubricating oil system. By means of the shifting oil system, the shifting elements can be acted upon with shifting oil, to close them. By means of the cooling and lubricating oil system the assemblies of the transmission, for example its gearsets and bearings, can be acted upon by cooling and lubricating oil.

In known transmissions the cooling and lubricating oil system of the transmission serves to supply all the assemblies of the transmission with cooling and lubricating oil, in particular the gearsets, bearings and shifting elements. On the other hand the transmission's shifting oil system serves exclusively to supply the shifting elements with shifting oil. In such transmissions the shifting elements, even when they are closed or open and therefore when they are not undergoing a shifting process, are still permanently or continually supplied by the cooling and lubricating oil system with cooling and lubricating oil, i.e. even at times when relatively little heat energy is being generated at those shifting elements. This continual cooling and lubrication of the shifting elements even when they are in a closed or open condition results in relatively substantial splash losses in the transmission. Moreover, an oil pump that provides the volume flow of the cooling and lubricating oil in the cooling and lubricating oil system has to be relatively large.

Transmissions with functionally separate oil systems, i.e. a shifting oil system which serves exclusively to supply the shifting elements with shifting oil and a cooling and lubricating oil system which serves to supply the gearsets, bearings and shifting elements with cooling and lubricating oil, are known from DE 10 2004 027 113A1 and also from DE 10 2011 081 006 A1.

SUMMARY OF THE INVENTION

Starting from there, the purpose of the present invention is to provide a new type of motor vehicle transmission and a method for its operation.

This objective is achieved by a transmission as described below.

According to the invention, from the shifting oil supplied by the shifting oil system a partial stream can be tapped off as necessary for cooling and/or lubricating the shifting elements, so that a quantity of cooling and lubricating oil that is or can be provided by the cooling and lubricating oil system can be reduced to the quantity required for cooling and/or lubricating those assemblies of the transmission which do not contain the shifting elements.

Since, according to the invention, from the shifting oil supplied by the shifting oil system a partial stream of shifting oil can be tapped off as necessary for cooling and/or lubricating the shifting elements, the cooling and lubricating oil system can be made smaller, in particular with a smaller oil pump. The quantity of cooling and lubricating oil that is or can be provided by the cooling and lubricating oil system is reduced to the quantity required for cooling and/or lubricating those assemblies of the transmission which do not contain shifting elements, i.e. to the maximum quantity of cooling and lubricating oil required for cooling and/or lubricating the gearsets and bearings. If more cooling and lubricating oil is needed, then from the shifting oil supplied by the shifting oil system a partial shifting oil stream can be tapped off as required for cooling and/or lubricating the shifting elements, i.e. whenever this is made necessary by the generation of heat at the shifting elements of the transmission as a result of carrying out shifting operations. Compared with conventional transmissions splash losses in the transmission can be reduced thereby.

According to an advantageous further development of the invention, for each shifting element the shifting oil system of the transmission comprises a control valve by way of which the shifting oil required for operating the shifting element concerned can be supplied to it, while the partial stream of shifting oil used for cooling and/or lubricating the shifting element can be tapped off downstream of the control valve concerned from the shifting oil supplied to the shifting element concerned. The partial shifting oil stream used for cooling and/or lubricating can be tapped off from the shifting oil to be supplied or that has been supplied to the shifting element concerned upstream of a shifting piston or shifting oil pressure chamber of the shifting element, or in the area of the shifting piston or shifting oil pressure chamber of the shifting element concerned. This further development of the invention is simple to construct and can be implemented with little design modification of the transmission.

In an alternative advantageous further development of the invention, for each shifting element the shifting oil system of the transmission has two control valves connected in parallel, namely a first control valve by way of which the shifting oil required for operating the shifting element concerned can be supplied to it from the shifting oil system, and a second control valve by way of which the shifting oil to be used for cooling and/or lubricating the shifting element can be supplied to it from the shifting oil system. This further development of the invention is also simple to construct, but it entails a design modification in the area of the control valves of the shifting oil system of the transmission.

Preferably, the partial stream of shifting oil used for cooling and/or lubricating the shifting element concerned can be tapped off from the shifting oil at least while the shifting element is undergoing a shifting operation. If necessary, however, the partial shifting oil stream used for cooling and/or lubricating the shifting element concerned can also be tapped off from the shifting oil even after the shifting process of the shifting element. When a partial shifting oil stream is tapped off for cooling or lubricating the shifting element concerned even after the shifting operation of the shifting element, the shifting element can also be cooled and/or lubricated beyond the actual shifting operation itself.

In an advantageous further development a rotational element is associated with each shifting element to promote a uniform distribution of the partial shifting oil stream tapped off from the shifting oil.

The method according to the invention is also described below.

BRIEF DESCRIPTION OF THE DRAWINGS

Preferred further developments of the invention emerge from the description given below. Example embodiments of the invention, to which it is not limited, are explained in greater detail with reference to the drawing, which shows.

DETAILED DESCRIPTION OF THE PREFERRED EMBODIMENTS

Figure 1:
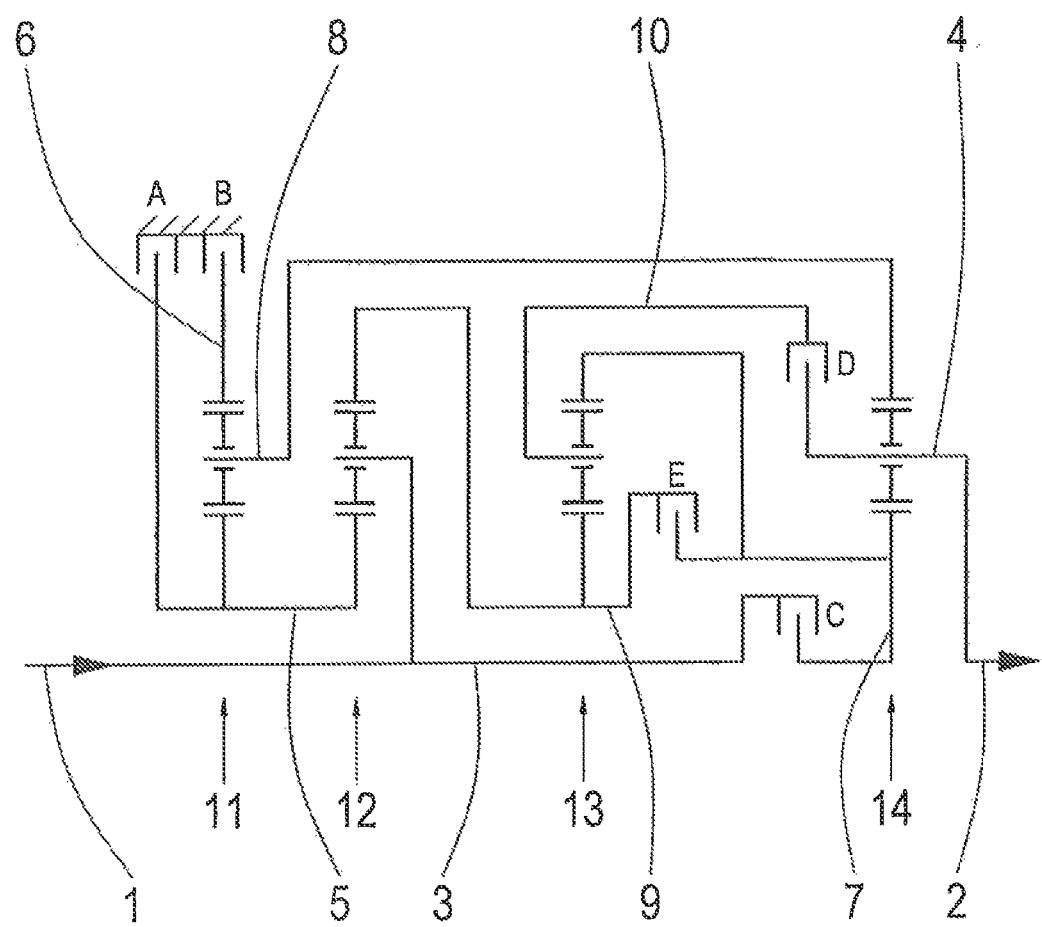
FIG. 1: An example of a gearset and shifting element layout of a transmission.

FIG. 1 shows a transmission layout of an example of an automatic transmission of a motor vehicle, wherein a drive aggregate (not shown) can be coupled to a transmission input 1 of the automatic transmission and a drive output of the motor vehicle (not shown) can be coupled to a transmission output 2 of the automatic transmission.

The automatic transmission illustrated in FIG. 1 has a total of eight shafts 3, 4, 5, 6, 7, 8, 9 and 10, the shaft 3 being a transmission input shaft and the shaft 4 being a transmission output shaft. The shafts 3 to 10 of the automatic transmission in FIG. 1 are in driving connection, on the one hand by way of gearsets 11, 12, 13 and 14 and on the other hand by way of transmission-internal shifting elements A, B, C, D and E.

The automatic transmission in FIG. 1 has four gearsets 11, 12, 13 and 14 and five shifting elements A, B, C, D and E, the shifting elements A and B being in the form of brakes and the shifting elements C, D and E being clutches. With the automatic transmission shown in FIG. 1 a total of eight forward gears and one reversing gear can be engaged, such that in each of these gears three shifting elements at a time are closed and two shifting elements are open.

The transmission layout in FIG. 1 is shown purely as an example. In addition to frictional shifting elements, interlocking shifting elements can also be present.

To carry out a gearshift and thus to carry out a shifting operation, at least one of the previously open shifting elements A, B, C, D and E is opened or disengaged and at least one of the previously closed shifting elements is opened or disengaged. To supply the shifting elements A, B, C, D and E as necessary with the shifting oil they require when undergoing a shifting operation, namely when a shifting element is being engaged or closed, the automatic transmission comprises a shifting oil system 15.

Figure 2:
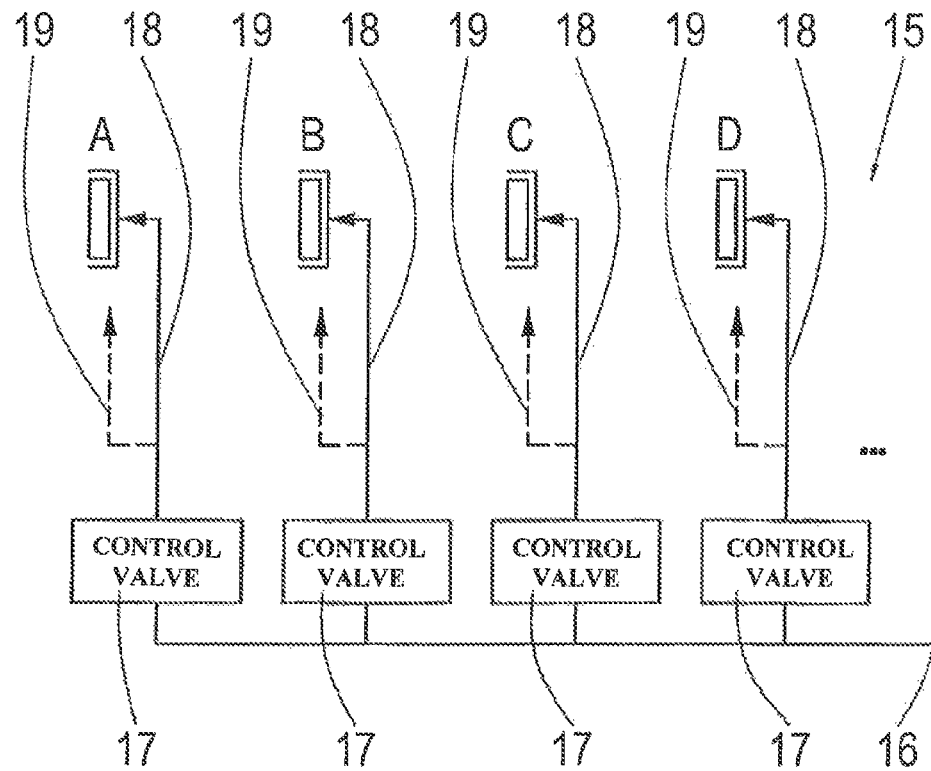
FIG. 2: A shifting oil system of a transmission according to the invention.

By virtue of the shifting oil system 15, the shifting elements A, B, C, D and E can be acted upon with shifting oil as necessary to close them, in such manner that each of the shifting elements A, B, C, D and E, of which in FIG. 2 only the shifting elements A, B, C and D are shown, can be acted upon individually with shifting oil from a central shifting oil line 16 by way of a control valve 17 specifically associated with the shifting element concerned. When shifting oil is needed at the shifting element A, the control valve associated with the shifting element A is opened in order to supply the shifting element A with shifting oil, as necessary, from the central shifting oil line 16. Thus, from the central shifting oil line 16 a shifting element-specific shifting oil line 18 branches off toward each of the shifting elements, which line 18 is connected to the central shifting oil line 16 when the control valve 17 is open and is cut off from the central shifting oil line 16 when the control valve 17 is closed.

In addition to the shifting oil system 15, the automatic transmission has a cooling and lubricating oil system (not shown), by means of which assemblies of the automatic transmission can be supplied with cooling and lubricating oil for their cooling and/or lubrication.

According to the invention, from the shifting oil provided by the shifting oil system 15 a partial stream can be tapped off in the area of each of the shifting elements A, B, C, D and E as necessary for cooling and/or lubricating the shifting elements A, B, C, D and E. A quantity of cooling and lubricating oil that is or can be supplied from the cooling and lubricating oil system can be reduced to the maximum quantity required for cooling and/or lubricating those assemblies of the transmission which do not contain the shifting elements A, B, C, D or E.

The cooling and lubricating oil supplied by the cooling and lubricating oil system (not shown) can be used for cooling and/or lubricating the gearsets 11, 12, 13 and 14 of the automatic transmission, for cooling and/or lubricating the bearings of the automatic transmission and for cooling and/or lubricating the shifting elements A, B, C, D and E of the automatic transmission.

If the cooling and lubricating oil required for cooling and/or lubricating the above assemblies of the automatic transmission is larger than the quantity of cooling and lubricating oil that can be provided by the cooling and lubricating oil system, then from the shifting oil supplied by the shifting oil system 15 a partial shifting oil stream is tapped off as necessary for cooling and/or lubricating the shifting elements A, B, C, D and E, and this is done for whichever shifting element or shifting elements where heat energy is actually being generated.

In the example embodiment shown in FIG. 2, in which the shifting oil system 15 comprises an individual control valve 17 for each shifting element, the partial shifting oil stream used for cooling and/or lubricating the shifting element concerned can be tapped off downstream of the corresponding control valve 17 from the shifting oil supplied to the shifting element concerned, namely according to FIG. 2 upstream of the shifting element A, B, C, D or E concerned, from the shifting element-specific shifting oil line 18 leading to the shifting element concerned.

Thus, as shown in FIG. 2, downstream of the control valve 17 and upstream of the shifting element concerned a shifting element-specific cooling and lubricating line 19 branches off from the shifting element-specific shifting oil line 18 leading to the shifting element concerned, by way of which line 19 the partial shifting oil stream tapped off can be supplied to the shifting element concerned for its cooling and/or lubrication.

Figure 4:
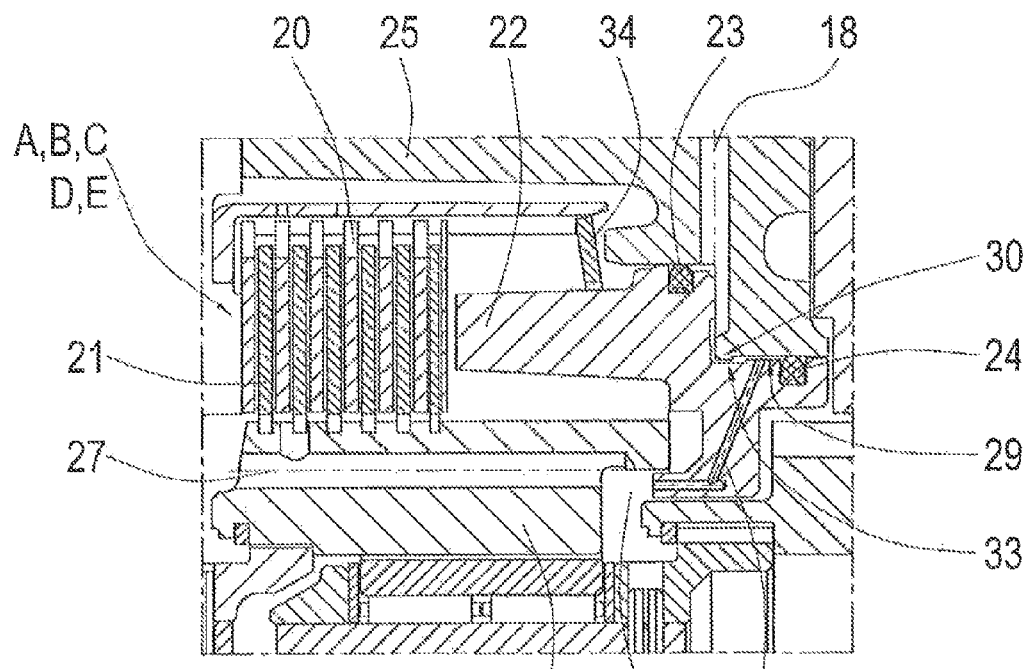
FIG. 4: A detail of a transmission according to the invention in the area of a shifting element.

FIG. 4 illustrates a variant of the invention in which the partial shifting oil stream used for cooling and/or lubricating can be tapped off from the shifting oil being supplied to the shifting element concerned, in the area of the shifting element. FIG. 4 shows a partial cross-section through an automatic transmission in the area of one of the shifting elements A, B, C, D or E. The shifting element A, B, C, D or E is in the form of a disk packet with outer disks 20 and inner disks 21, such that the outer disks 20 and the inner disks 21 of the disk packet can be pressed together by applying a control pressure to a shifting piston 22 of the shifting element concerned in order to close the shifting element. The shifting oil required for closing the shifting element is supplied to the shifting piston 22 of the shifting element by way of a shifting element-specific shifting oil line 18 leading to the shifting element, wherein a shifting oil pressure chamber 33 that co-operates with the shifting piston 22, into which chamber the shifting oil is fed, in delimited by the shifting piston 22 and a disk carrier 25 and by two seals 23 and 24 which seal the shifting piston 22 relative to a housing or disk carrier 25.

If the shifting element is a clutch, the assembly 25 is a disk carrier. If the shifting element is a brake, the assembly 25 is a housing.

As shown in FIG. 4, a bore is formed in the shifting piston 22, which branches off from the shifting oil pressure chamber 33 of the shifting piston 22 delimited by the seals 23, 24, so that via the bore 26, from the shifting oil supplied to the shifting piston 22 a partial stream can be tapped off, which then serves for cooling and/or lubricating the shifting element concerned.

As shown in FIG. 4, the bore 26, which passes through the shifting piston 22, opens into a bore 27 in a ring gear 28 of the transmission, so that by way of this bore 27, in the ring gear 28 the partial stream tapped off from the shifting oil can be delivered to the shifting element concerned for cooling and/or lubricating it.

In the variant shown in FIG. 4 as well, as in the variant shown in FIG. 2, a respective control valve 17 is associated with each shifting element, but in contrast to FIG. 2 the partial shifting oil stream is tapped off from the shifting oil not upstream of the shifting element concerned, but rather, in the area of the shifting element, namely in the area of the shifting piston 22 or the shifting oil pressure chamber 33 thereof.

In the variant of the invention shown in FIG. 4 the shifting piston 22 and the disk carrier 25, which together with the seals 23 and 24 define the shifting oil pressure chamber 33 of the shifting element concerned, are configured in such manner that although the partial shifting oil stream used for cooling and/or lubricating the shifting element can be tapped off from the shifting oil via the bore 26 formed in the shifting piston 22 during the shifting process of the shifting element concerned, this cannot be done after the actual shifting process. That is because in the area in which the bore 26 opens into the shifting oil pressure chamber 33 the shifting piston 22 has a projection 29 which, after the displacement of the shifting piston 22 brought about by applying the control pressure, co-operates with a corresponding projection 30 on the disk carrier 25 so as to block off the bore 26, preventing any further partial stream from being tapped off from the shifting oil. In contrast, in the variant shown in FIG. 5 the projections 29 and 30, respectively on the shifting piston 22 and the disk carrier 25, are absent so that in FIG. 5, even after the actual shifting operation a partial stream can be tapped off from the shifting oil in the shifting piston 22 for cooling and/or lubricating the corresponding shifting element.

In each case the bore 26 in the shifting piston 22 has dimensions such that it acts as a throttle, so that via the shifting oil line 18 of the shifting element concerned, a larger shifting oil quantity is passed to the shifting piston 22 of the shifting element than the quantity of shifting oil tapped off via the bore 26 in the shifting piston 22 for cooling and/or lubricating the shifting element.

It should be mentioned that in the shifting piston 22 of a shifting element more than one bore 26 can be formed in order to tap off the partial stream of shifting oil.

Figure 5:
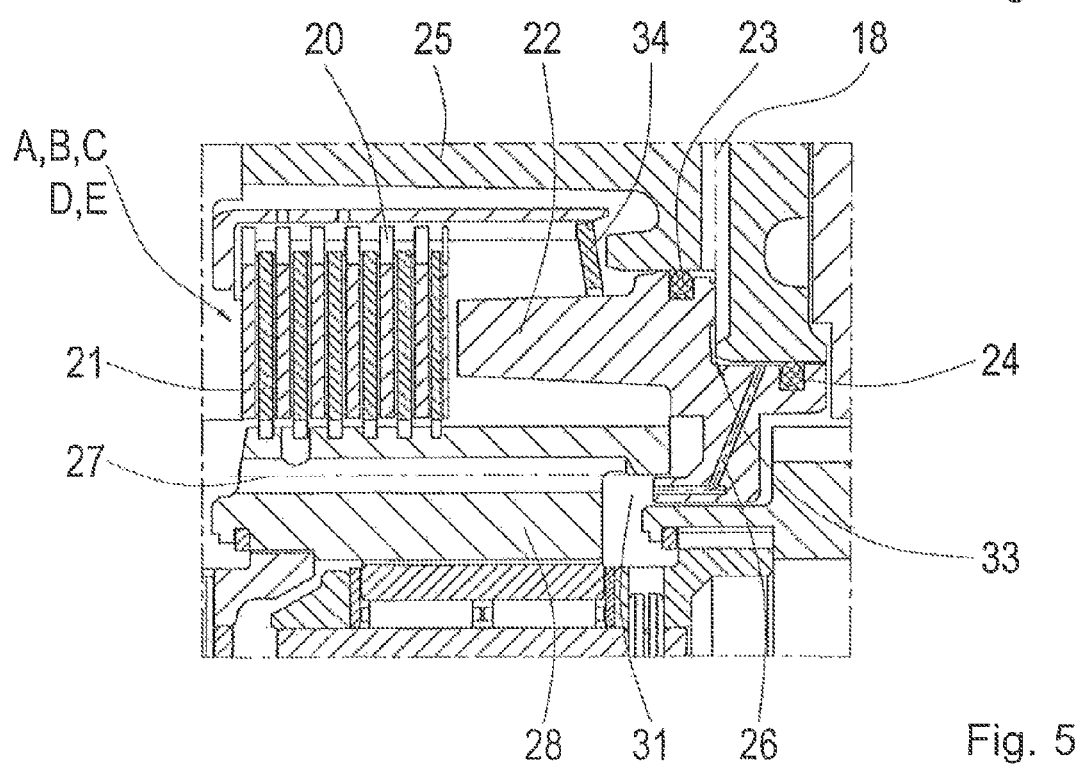
FIG. 5: An alternative detail of a transmission according to the invention in the area of a shifting element.

In an advantageous further development of the invention, the shifting element illustrated in FIGS. 4 and 5 can be associated with a rotation element for the uniform distribution of the partial stream tapped off from the shifting oil, in order to distribute the shifting oil tapped off for cooling and/or lubricating the shifting element concerned in a uniform manner. In the example embodiments shown in FIGS. 4 and 5, a rotation element of such type is preferably accommodated in a free space 31 formed between the ring gear 28 and the shifting piston 22, between the bores 26 and 27.

Figure 3:
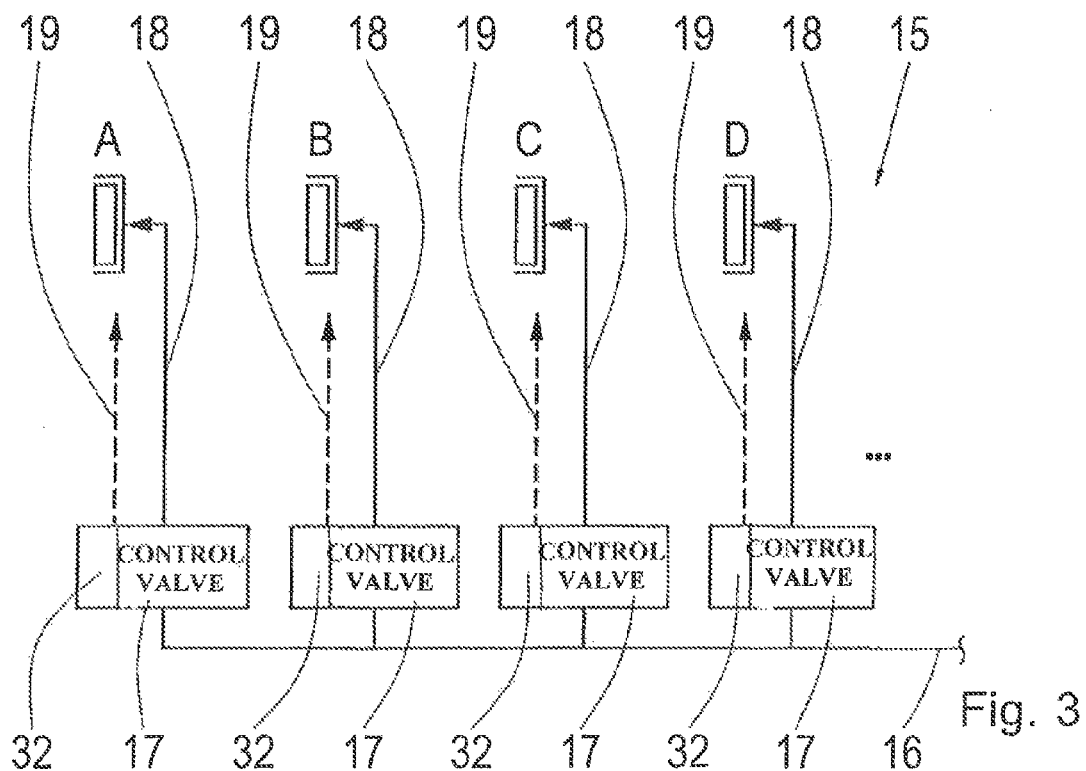
FIG. 3: An alternative shifting oil system of a transmission according to the invention.

FIG. 3 shows a variant of a shifting oil system 15 of a transmission according to the invention, in which two control valves 17, 32 connected in parallel are associated with each shifting element. A first control valve 17 serves as necessary for the operation of the shifting element, namely for supplying shifting oil from the central shifting oil line 16 to the shifting element concerned by way of the shifting element-specific shifting oil line 18. By way of a second control valve 32 connected parallel to the first control valve 17, the shifting element concerned can be supplied from the central shifting oil line 16, as necessary, with a partial stream of shifting oil for cooling and/or lubrication, namely via a shifting element-specific cooling and/or lubricating line 19. Accordingly, in the variant shown in FIG. 3 as well each shifting element is cooled and/or lubricated as necessary from the shifting oil system 15, namely by means of a partial stream tapped off from the shifting oil, although in contrast to the variant shown in FIG. 2, in the variant in FIG. 3 two control valves 17 and 32 connected in parallel are provided for each shifting element. These control valves 17 and 32 connected in parallel can be individual control valves, or a dual control valve.

In FIG. 3, if the opening times of the control valves 17, 32 connected in parallel are identical, then each of the shifting elements can be supplied as necessary with the partial stream tapped off from the shifting oil for cooling and/or lubricating the shifting element, both while the shifting process is in progress and also after the actual shifting operation itself.

By making the opening time of the control valve 32 shorter, in the variant shown in FIG. 3 it is also possible to supply the shifting element concerned with a partial stream tapped off from the shifting oil for cooling and/or lubricating the shifting element, exclusively during the actual shifting operation itself.

Accordingly, by virtue of the present invention shifting elements of an automatic transmission can be cooled and lubricated as necessary, and this from the shifting oil system 15, in such manner that from the shifting oil supplied for operating the shifting element concerned a partial stream is tapped off, which is then used for cooling and/or lubricating the shifting element.

The cooling and lubricating oil system provides a quantity of cooling and lubricating oil which is the maximum needed for cooling and/or lubricating those assemblies of the transmission which do not contain the shifting elements. If a total quantity of cooling and lubricating oil required for cooling and/or lubricating is larger than the quantity that is or can be supplied by the cooling and lubricating oil system, then the shifting elements are supplied with cooling and lubricating oil from the shifting oil system, namely in that, as necessary for the shifting element concerned, a partial stream of shifting oil is tapped off for cooling and/or lubricating the shifting element concerned. In this way splash losses in the transmission can be reduced.

The partial shifting oil stream can be tapped off for cooling and/or lubrication both during and after the closing, and also both during and after the opening of the shifting element A, B, C, D or E concerned, for cooling and/or lubricating the shifting element. However, during and after an opening process the pressure in the shifting oil line 18 leading to the shifting element A, B, C, D or E concerned, or the pressure in the respective shifting oil pressure chamber 33, must be low enough to ensure that the opened shifting element to be cooled does not close again. If a shifting piston 22 is acted upon by a restoring spring 34, the actuation force for the shifting piston 22, which depends on the pressure in the respective shifting oil pressure chamber 33, must be smaller than the restoring force of the restoring spring 34.

INDEXES

1 Transmission input
2 Transmission output
3 Shaft
4 Shaft
5 Shaft
6 Shaft
7 Shaft
8 Shaft
9 Shaft
10 Shaft
11 Gearset
12 Gearset
13 Gearset
14 Gearset
15 Shifting oil system
16 Shifting oil line
17 Control valve
18 Shifting oil line
19 Cooling and/or lubricating line
20 Outer disks
21 Inner disks
22 Shifting piston
23 Seal
24 Seal
25 Disk carrier/Housing
26 Bore
27 Bore
28 Ring gear
29 Projection
30 Projection
31 Free space
32 Control valve
33 Shifting oil pressure chamber
A Shifting element/Brake
B Shifting element/Brake
C Shifting element/Clutch
D Shifting element/Clutch
E Shifting element/Clutch

The invention claimed is:

1. A transmission of a motor vehicle comprising:
a plurality of shifting elements (A, B, C, D, E) which are selectively engaged and disengaged when a gearshift is carried out,
a plurality of gearsets (11, 12, 13, 14) for producing, depending on a shifting position of the shifting elements and hence depending on a gear engaged, a defined transmission ratio,
a shifting oil system (15) for supplying the shifting elements with shifting oil in order to operate the shifting elements, the shifting oil system having a central shifting oil line and a plurality of shifting oil supply lines, and each of the shifting oil supply lines communicates with the central shifting oil line and a respective one of the plurality of shifting elements such that a flow of shifting oil is deliverable to each of the shifting elements via a respective one of the plurality of shifting oil supply lines, and
a cooling and lubricating oil system for supplying assemblies of the transmission with cooling and lubricating oil for at least one of cooling and lubricating the assemblies of the transmission,
a tap is arranged in each of the shifting oil supply lines such that a partial stream of shifting oil is divertable, via the tap, from the flow of shifting oil to the respective shifting element for at least one of cooling and lubricating the shifting elements (A, B, C, D, E) such that a quantity of the cooling and lubricating oil, that is supplied by the cooling and lubricating oil system is reducible to a quantity required for the at least one of cooling and lubricating the assemblies of the transmission which do not contain the shifting elements (A, B, C, D, E).

2. The transmission according to claim 1, wherein the shifting oil system (15) comprises a control valve (17) for each of the plurality of shifting elements (A, B, C, D, E) by which the flow of shifting oil supplied, as necessary, to the associated shifting element, and the partial stream of shifting oil, used for the at least one of cooling and lubricating the associated shifting element, is tapped off from the flow of shifting oil to be supplied to the associated shifting element downstream of the respective control valve (17).

3. The transmission according to claim 2, wherein the partial shifting oil stream, used for the at least one of cooling and lubricating, is tapped off from the shifting oil to be supplied to the shifting element concerned upstream of either a shifting piston (22) or a shifting oil pressure chamber (33) of the shifting element concerned (A, B, C, D, E).

4. The transmission according to claim 2, wherein the partial shifting oil stream, used for the at least one of cooling and lubricating, is tapped off from the shifting oil to be supplied to the shifting element concerned in an area of either a shifting piston (22) or a shifting oil pressure chamber (33) of the shifting element concerned (A, B, C, D, E).

5. The transmission according to claim 1, wherein, for each of the shifting elements (A, B, C, D, E), the shifting oil system (15) comprises first and second control valves (17, 32) connected in parallel with one another, the first control valve (17) supplies, from the shifting oil system, the shifting oil required for operating the shifting element concerned, and the second control valve (32) supplies, from the shifting oil system, the partial shifting oil stream required for the at least one of cooling and lubricating the shifting element concerned.

6. The transmission according to claim 1, wherein the partial stream of shifting oil used for the at least one of cooling and lubricating the associated shifting element (A, B, C, D, E) is tapped off from the flow of shifting oil at least during a shifting process of the associated shifting element.

7. The transmission according to claim 6, wherein the partial shifting oil stream used for the at least one of cooling and lubricating the shifting element (A, B, C, D, E) concerned is tapped off from the shifting oil after the shifting process of the shifting element.

8. The transmission according to claim 1, wherein the transmission further comprises a rotation element for uniform distribution of the partial stream tapped off from the shifting oil.

\* \* \* \* \*